Sept. 30, 1958 J. C. KINLEY 2,853,788
INTERNAL PIPE CALIPERING TOOLS AND RECORDING MEANS
Filed Dec. 13, 1954 7 Sheets-Sheet 1
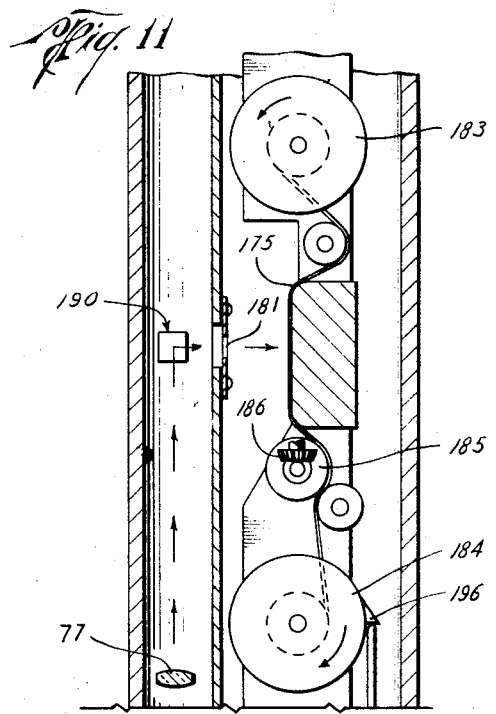
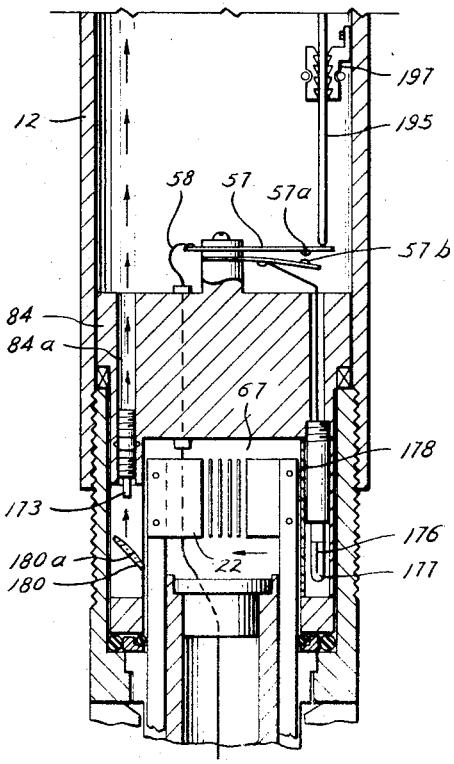
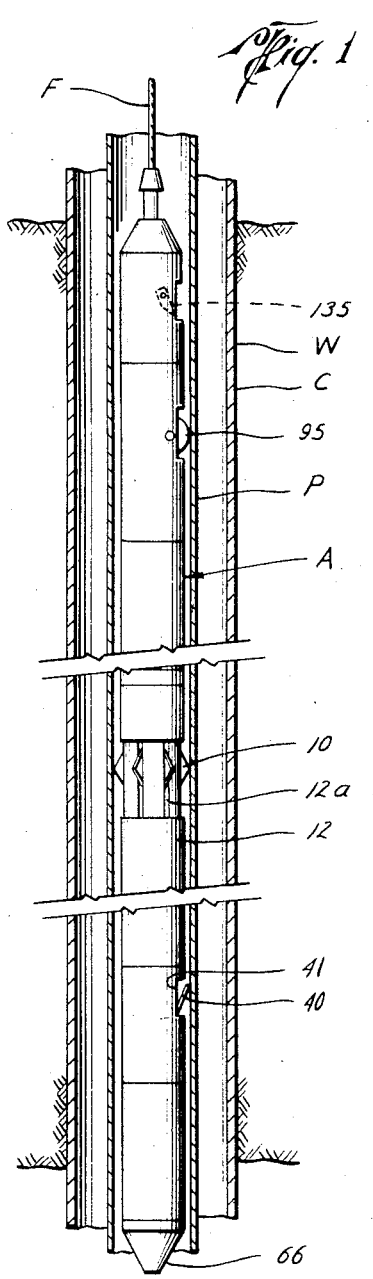
John C. Kinley
INVENTOR.
BY J. Vincent Martin
Joe E. Edwards
B. R. Pravel
ATTORNEYS

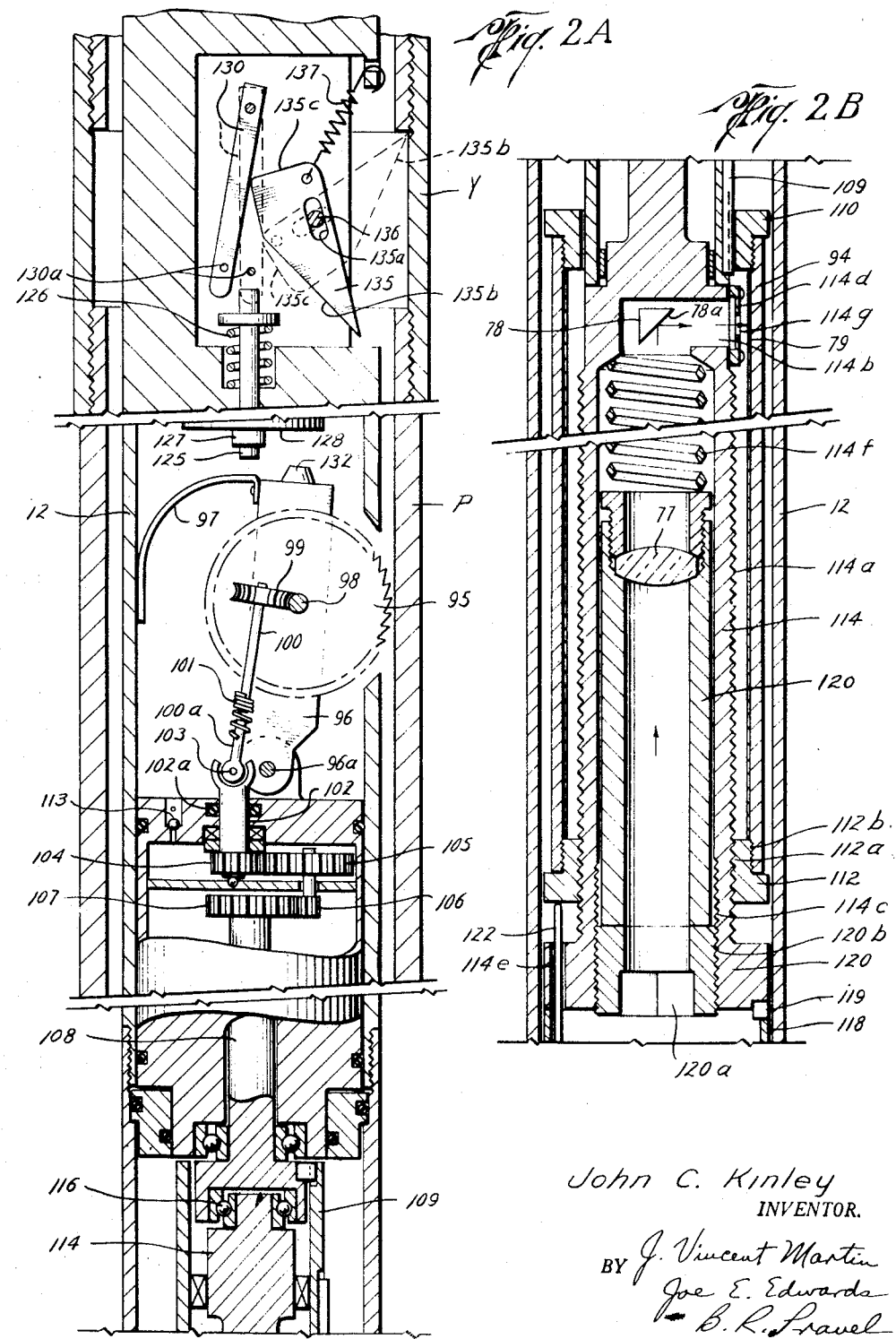

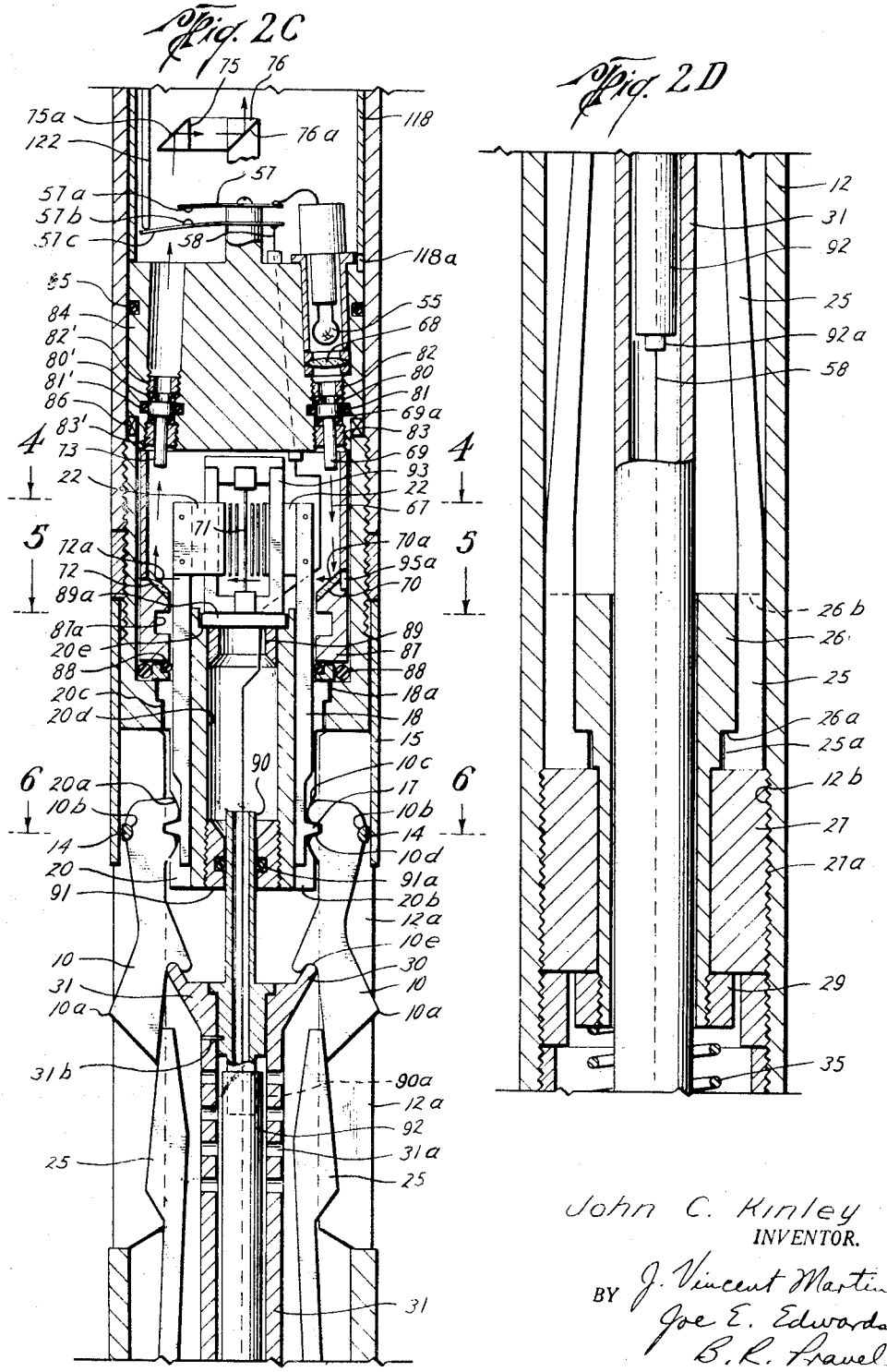

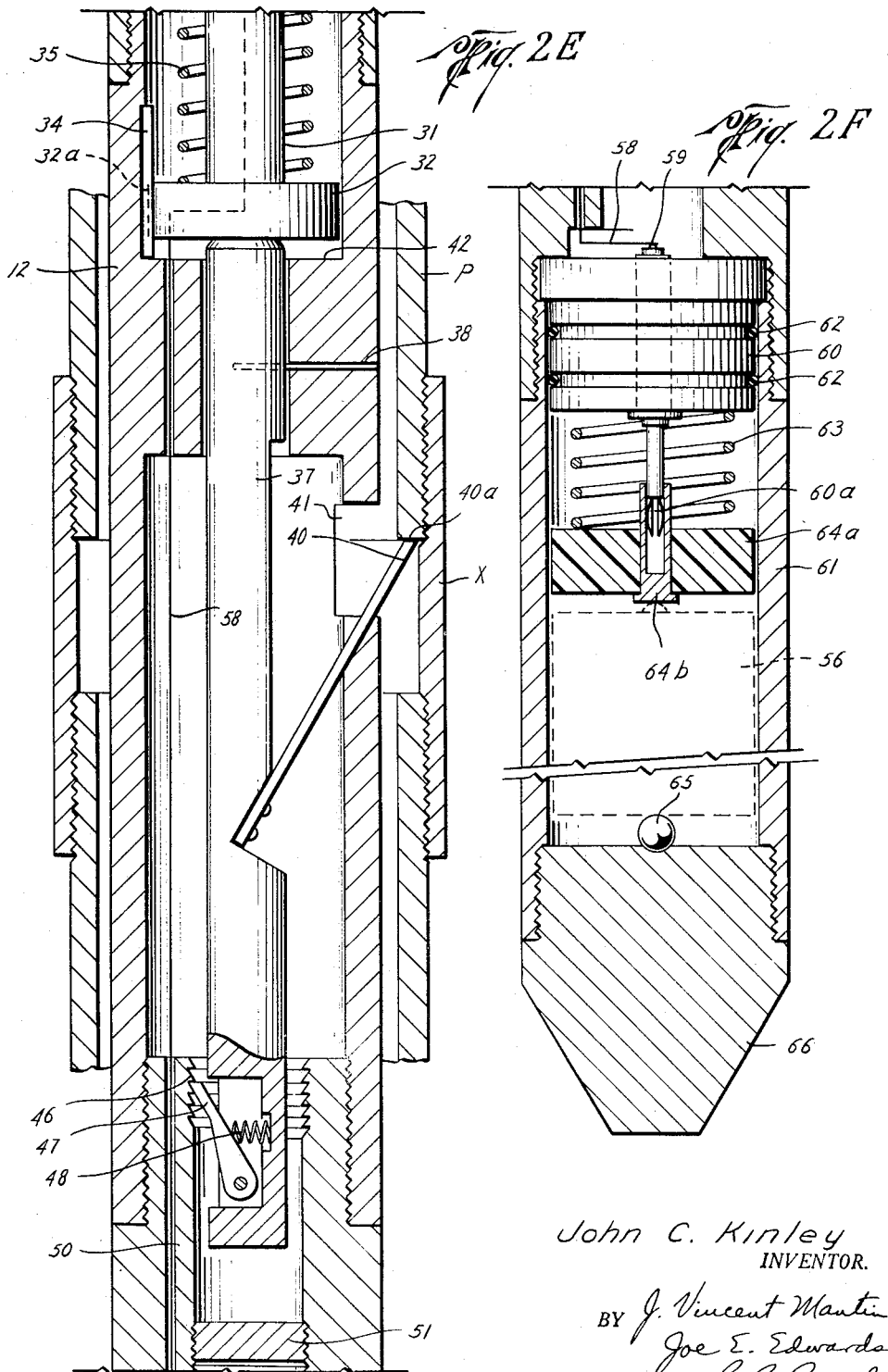

Sept. 30, 1958  J. C. KINLEY  2,853,788
INTERNAL PIPE CALIPERING TOOLS AND RECORDING MEANS
Filed Dec. 13, 1954  7 Sheets-Sheet 5

John C. Kinley
INVENTOR.
BY J. Vincent Martin
Joe E. Edwards
B. R. Pravel
ATTORNEYS

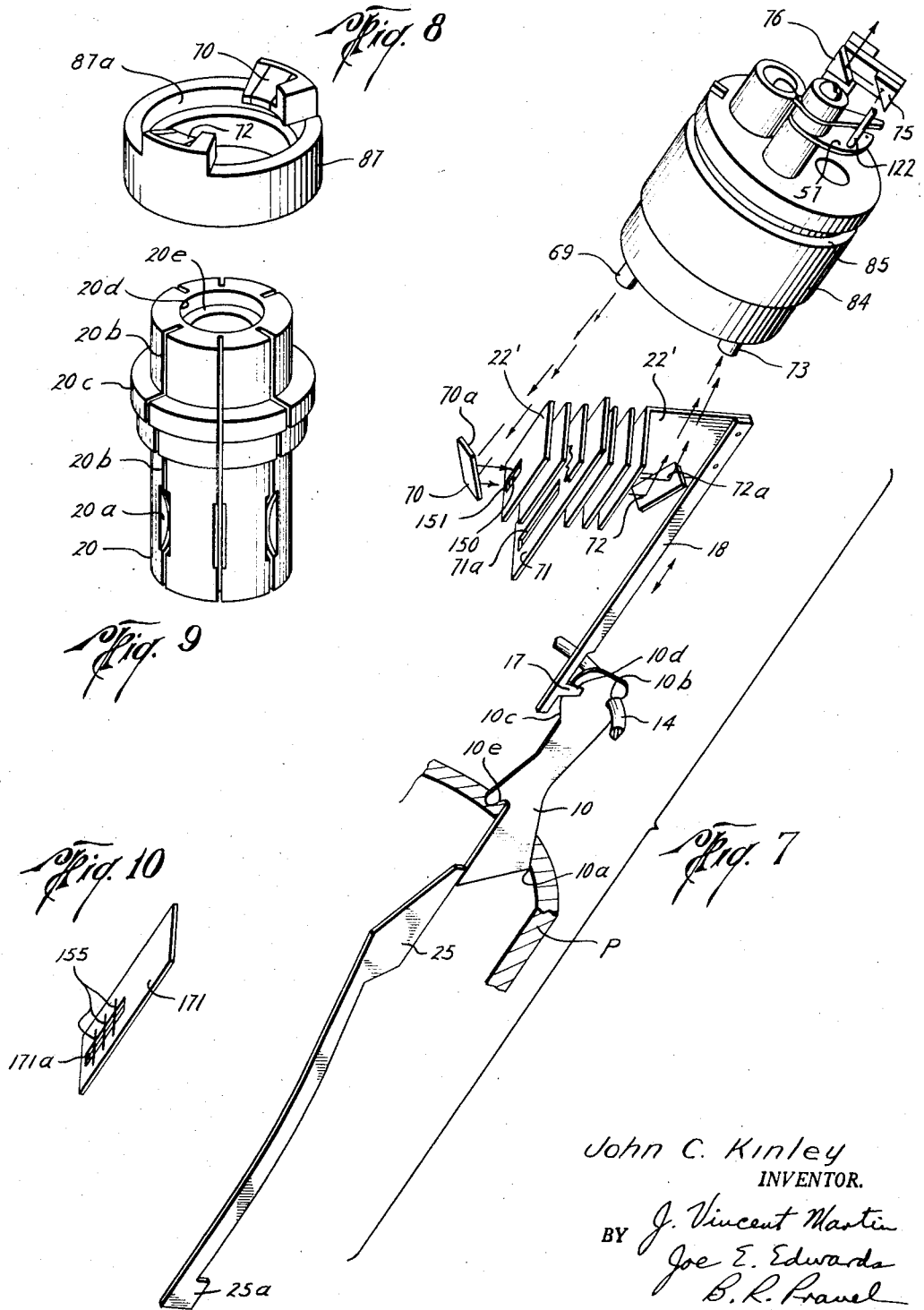

Sept. 30, 1958   J. C. KINLEY   2,853,788
INTERNAL PIPE CALIPERING TOOLS AND RECORDING MEANS
Filed Dec. 13, 1954   7 Sheets-Sheet 7
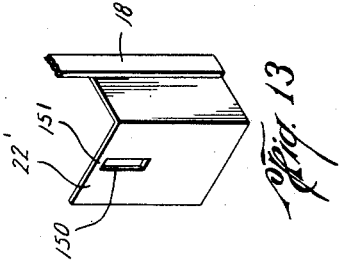
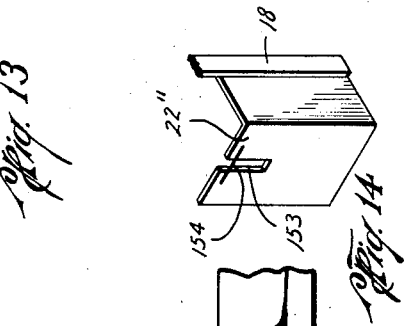
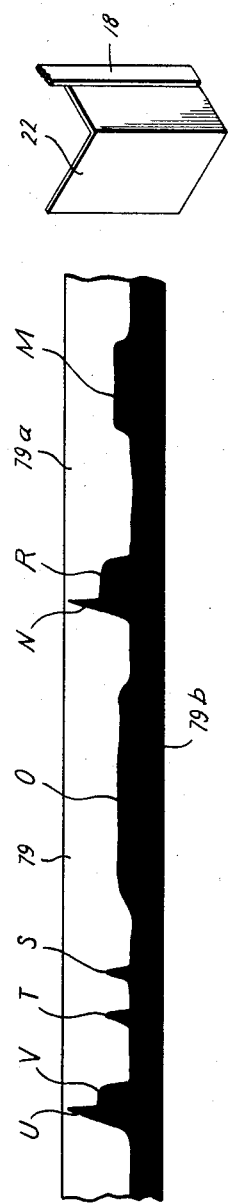
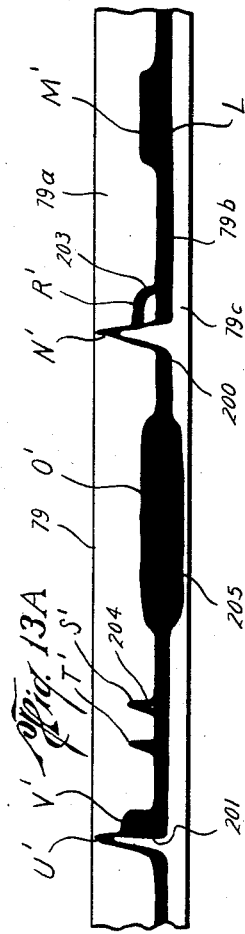
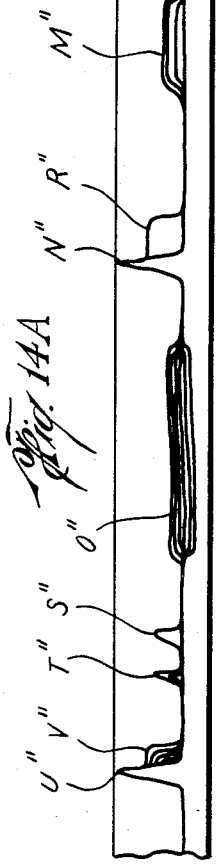
John C. Kinley
INVENTOR.
BY J. Vincent Martin
Joe E. Edwards
B. R. Pravel
ATTORNEYS United States Patent Office 2,853,788
Patented Sept. 30, 1958

2,853,788
INTERNAL PIPE CALIPERING TOOLS AND RECORDING MEANS

John C. Kinley, Houston, Tex.

Application December 13, 1954, Serial No. 474,725

19 Claims. (Cl. 33—178)

This invention relates to new and useful improvements in calipering tools.

An object of this invention is to provide a well tool having a new and improved recording means therewith.

An important object of this invention is to provide a new and improved calipering tool for obtaining an indication of surface irregularities, such indication being obtained photographically.

Another object of this invention is to provide a new and improved pipe calipering tool wherein a means is provided for making a record of the surface irregularities in the pipe being calipered by said tool, such record being made by projecting a light beam onto a photosensitive surface while varying the light beam in accordance with the surface variations in the pipe being calipered.

Another object of this invention is to provide in a calipering tool means for photographically making a record of the surface irregularities in a pipe or the like, such record being made by varying a light beam in response to the furthest outward feeler or contact member of the calipering tool.

A further object of this invention is to provide a calipering tool for obtaining a record of the surface irregularities in a pipe or the like, wherein a plurality of contact members or feelers are adapted to engage the inner surface of the pipe, and wherein the record obtained is an indication of the simultaneous maximum and minimum movement of the feelers as the tool is moved through the pipe or across a similar surface.

A still further object of this invention is to provide a calipering tool for obtaining a record of the surface irregularities in the pipe or the like wherein means are provided for recording the position of each feeler in the tool as the tool is moved through the pipe or the like with the feelers in contact with the pipe surface or the like.

Still another object of this invention is to provide a new and improved calipering tool having a recording mechanism wherein a light beam is transmitted from a sealed portion of the tool into a fluid under pressure from fluid in the well in which the tool is lowered, the light beam being varied in response to the surface irregularities in the pipe being calipered and then being transmitted from the liquid into a sealed portion of the tool for exposure on a light sensitive recording chart surface, whereby a record is obtained.

The construction designed to carry out the invention will be hereinafter described, together with other features thereof.

The invention will be more readily understood from a reading of the following specification and by reference to the accompanying drawings forming a part thereof, wherein an example of the invention is shown, and wherein:

Figure 1 is a view, partly in elevation and partly in section, illustrating the calipering tool of this invention in use during the calipering of the internal surface of a well tubing.

Figures 2A–2F are views, partly in elevation and partly in section, which together illustrate the details of construction in one form of the calipering tool of this invention, such views being numbered consecutively from Figure 2A at the top to Figure 2F at the bottom.

Figure 7 is an isometric view illustrating, in part, portions of the calipering tool of this invention.

Figure 8 is an isometric view illustrating a means for mounting the mirrors or light reflectors for directing the light beam used in the recording mechanism of the calipering tool of this invention.

Figure 9 is an isometric view illustrating the construction of the guide sleeve for guiding the longitudinal movement of the support arms for the interceptor strips.

Figure 10 is an isometric view illustrating a modified slit member.

Figure 11 is a view, partly in elevation and partly in section, illustrating a modified portion of the apparatus illustrated in Figures 2A–2F.

Figure 12 illustrates a single interceptor strip.

Figure 12A is a typical photographic record obtained when using the interceptor strip illustrated in Figure 12.

Figure 13 is a view similar to Figure 12, but illustrating a modified interceptor strip.

Figure 13A is an illustration of the photographic record obtained when using a plurality of interceptor strips of the type illustrated in Figure 13.

Figure 14 is a view similar to Figure 12, but illustrating a modified form of the interceptor strip.

Figure 14A illustrates a photographic record obtained when using a plurality of interceptor strips of the type illustrated in Figure 14.

Figure 3:
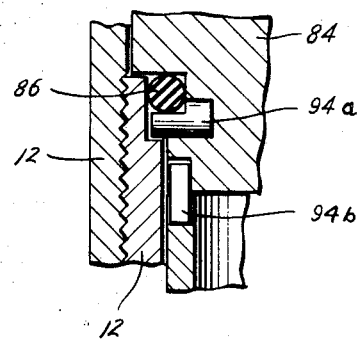
Figure 3 is a sectional view illustrating a fragmentary portion of the apparatus shown in Figure 2C and particularly illustrating the lock means and seal thereof.

In the drawings, the letter A designates the calipering tool of this invention which is adapted to be positioned within a tubing, casing, or other pipe P for measuring the surface irregularities on the inside surface thereof. In the usual case, such pipe P is disposed in a well bore W which may have a casing C therein. When the calipering tool A is positioned in a tubing or pipe P in a well bore, such tool A is moved longitudinally with respect to the tubing or pipe P by a wire line or other support F which extends to the surface of the well. As the tool A is thereby moved relative to the inside surface of the tubing or pipe P, contact members or feelers 10 contact the inside surface of the tubing or pipe P whereby such feelers 10 are moved in accordance with the surface irregularities encountered on the inside surface of the tubing or pipe P. As will be explained in detail, the movements of the feelers 10 are transmitted to a recording mechanism in the tool A whereby a record is obtained which is indicative of the surface irregularities in the surface being calipered by the tool.

Figure 6:
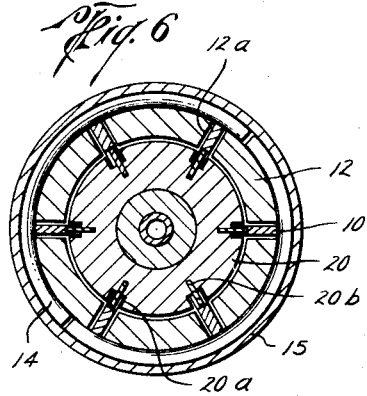
Figure 6 is a horizontal sectional view taken on line 6—6 of Figure 2C and illustrates in particular the mounting of the feelers or contact members of the device.

The details of a complete embodiment of the well tool of this invention are illustrated in Figures 2A-2F. In Figure 2C, it can be seen that the feelers or contact members 10 are slidably disposed in longitudinally extending radial slots 12a of a sleeve or housing 12 (see also Figures 1 and 6). Each feeler 10 has a contact portion 10a which is adapted to contact or engage the inside surface of the pipe being calipered. Also, each feeler 10 has a pivot portion or arcuate recess 10b about which it pivots during its lateral or radial movement in the slot 12a therefore. An annular ring, or ring segments 14, are positioned in the pivot portions 10b, with such ring or rings 14 (Figures 6 and 7) being held in contact with the pivot portion 10b of each feeler 10 by a removable retaining sleeve 15. The inner surface of each feeler 10 is formed with a curved surface 10c having a recess 10d formed intermediate thereof for receiving a gear tooth 17 carried by each support arm 18. The curved surface 10c engages with the curved recess 20a formed in the external surface of the back-up elements or cylinder 20 (Figures 6 and 9). As the feelers 10 each move laterally or radially within the longitudinal slot 12a, they pivot about the pivot ring 14 which remains fixed relative to the sleeve 15 during such pivotal movement of the feelers 10. During such pivotal movement, the internal curved surface 10c is in contact with the wall of the recess 20a of the back-up element or cylinder 20. Also, because of the interengagement of each gear tooth 17 with each gear tooth recess 10d of each feeler 10, the members 18 are moved longitudinally in the guide slots 20b of the cylinder 20. Thus, the support members 18 are moved longitudinally relative to the back-up element or cylinder 20 in response to the lateral or radial movement of the particular feeler 10 associated with each member 18. At the upper end of each support member or bar 18, there is mounted a light interceptor strip 22, each of which is moved in accordance with the longitudinal movement of the support member 18 connected thereto, whereby the movement of each light interceptor strip 22 is in response to the movement of the feeler 10 associated therewith. The arrangement of the light interceptor strips in respect to each other, and the purpose of such longitudinal movement of the strips, will be described hereinafter.

A resilient urging or spring member 25 contacts the lower inner end of each feeler 10 for urging each feeler 10 separately outwardly into contact with the inside surface of the pipe being calipered. Such resilient urging members 25 may be formed in numerous ways, but as shown in the drawings, each urging member 25 is guided by the walls of the slots 12a in its lateral movement for urging the feelers 10 laterally. In other words, in the specific construction illustrated both the feelers 10 and the urging members 25 are of the same width, or substantially the same width so that the walls of the slots 12a in which they are mounted serve to guide the lateral or radial movement thereof. However, it will be understood that the width of the feelers 10 may be different than the width of the members 25, and the width of the slots 12a may be varied so that the walls thereof still serve to guide the lateral movement of both the feelers 10 and the members 25. The lower ends of the members 25 have inwardly-extending projections 25a which fit below a shoulder 26a in a retaining collar 26. Such collar 26 is formed with a plurality of longitudinal slots 26b which are of substantially the same width as the width of the lower ends of each resilient urging member 25. The members 25 are locked in position on the collar 26 and within the housing 12 by a threaded lock ring 27 which has external threads 27a in threaded engagement with internal threads 12b in the housing 12 (Figure 2D). The lower end of the collar 26 has a nut 29 threaded thereon for abutment with the threaded sleeve 27 whereby the resilient members 25 are securely held at their lower end against longitudinal or lateral movement with respect to the housing 12. However, it will be evident that the inherent resiliency of each member 25 tends to urge same outwardly from the position shown in Figure 2C so that an outward force is applied to each feeler 10 for maintaining same in contact with the surface of the pipe being calipered.

During the lowering of the tool into a well tubing, it is generally desirable to maintain the feelers 10 in a retracted position so that no record will be obtained during such lowering, but when the tool has reached a lower end of the pipe P, or the portion thereof to be calipered, then the feelers 10 are released for contact with the surface of the pipe. A means for locking the feelers 10 in a retracted position is particularly illustrated in Figures 2C, 2D and 2E. It will be observed that each feeler 10 has an inwardly-extending latching groove 10e formed therein for engagement with the annular latch or lock ring 30, whereby the feelers 10 are held inwardly when the projection 30 is within the respective notches or grooves 10e. The annular projection 30 is formed at the upper end of the sleeve 31 which has a stop flange 32 at its lower end (Figure 2E). The flange 32 is provided with a keyway 32a which receives a key 34 in the housing 12 to thereby prevent rotation so that the wire 58 is not twisted or sheared. A spring 35 is confined between the nut 29 (Figure 2D) and the flange 32 (Figure 2E) for normally exerting a downward force on the sleeve 31.

During the running in of the tool into the well pipe, the annular locking projection 30 in maintained within the notches 10e despite the downward urging of the spring 35 because the flange 32 is held in a raised position by the contact of its lower end with the upper end of the locking rod 37. A shear pin 38 extends through the body 12 into the rod 37 for maintaining the rod 37 in a raised position for thereby holding the flange 32, sleeve 31 and locking projection 30 in the raised position, whereby the feelers 10 are held in their retracted position.

The rod 37 carries a release member 40 of a resilient material which extends through an opening 41 in the housing 12 so that it constantly contacts the internal surface of the tubing or pipe P as the tool A is lowered in the pipe. It will also be evident that the release member 40 rides past each collar as the tool moves downwardly. However, upon an upward movement of the tool in the pipe P, the upper end 40a of the release member 40 engages in the collar X and a continued upward movement of the tool A after such engagement in the collar X causes the downward movement of release member 40 relative to the tool to be transferred to the rod 37, whereby the rod 37 is moved downwardly relative to the tool with a sufficient force to shear the shear pin 38. The downward movement of the rod 37 permits the spring 35 to act downwardly to move the flange 32 to a seated position on the radial shoulder 42 in the housing 12. The shoulder 42 is spaced sufficiently below the lower edge of the flange 32 so that upon the downward movement of the flange 32 after the shearing of shear pin 38, the projection 30 is released from the recesses 10e of the feelers 10 but the projection 30 does not move downwardly far enough to contact or otherwise interfere with the action of the springs 25. Thus, the feelers 10 are released and the resilient urging members 25 are free to urge the feelers 10 outwardly into engagement with the internal surface of the pipe P. To prevent the rod 37 from returning or sliding upwardly, a ratchet means including a ratchet surface 46 and a catch-arm 47 are provided. The catch-arm 47 is resiliently urged outwardly by a spring 48 so that the upper end of the arm 47 engages the downwardly-extending teeth of the ratchet 46 so as to prevent the rod 37 from moving upwardly with respect to the ratchet body 50 or the housing 12. It will thus be evident that the initial lowering of the rod 37 to shear the shear pin 38 results in a dropping of the rod 37 to a lowered position so that it no longer interferes with the downward movement of the flange 32 into seating contact with the radial shoulder 42. It will be observed that the plug 51 limits the downward movement of the rod 37 within the ratchet body 50.

As soon as the lock ring for retaining the feelers 10 in a retracted position is released, then the feelers 10 are free to move in response to surface variations or irregularities in the pipe surface being calipered. As previously mentioned such movement of the feelers is transmitted to the light interceptor strips or members 22. For recording the feeler movement so as to obtain a record or indication of the surface irregularity in the surface being calipered, a light beam is projected or transmitted in a predetermined path in such a manner that at least one of the light interceptor strips 22 varies the extent of the light beam, whereby an indication of the surface condition of the pipe being calipered is obtained, as will be explained.

The light beam is initiated at a light source, which in the present invention takes the form of an electric light bulb 55 which is electrically connected to a battery 56 or some other source of electrical power. The light bulb 55 is grounded through the housing 12 and is connected to the battery 56 through a switch 57 having contacts 57a and 57b, and a wire 58 which extends from the switch 57 downwardly through the housing or body 12 to the electrical connection of 59 (Figure 2F).

The electrical connection 59 is formed at the top of a sealing plug or cap 60 which is disposed in the battery chamber 61 for providing a fluid seal by means of seal rings 62 which are formed of rubber or other resilient material for preventing fluid from entering the battery chamber 61. The cap 60 acts against a spring 63 which contacts an insulator ring 64a to thereby urge a contact element 64b downwardly into electrical contact with the battery 56. A banana-type plug 60a is carried at the lower end of the cap 60 for insertion and electrical contact with the contact 64b, whereby the electrical connection from the light bulb 55 to the battery 56 is completed. Of course, the contacts 57a and 57b must be engaged to complete the electrical circuit. It will also be observed that the lower end of the battery 56 is grounded by contact of a ball 65 with the plug 66 so that the battery is grounded to complete the electrical circuit when the switch 57 is closed.

The light from the light bulb 55 is formed into a light beam as it passes through a convex lens 68 and thereafter the light beam is directed through a flanged barrier member 69 which is formed of glass or plastic capable of passing light therethrough. The chamber below the barrier member 69 has a fluid therein, the details of which will be explained hereinafter, through which the light passes from the barrier member 69 to a mirror or other light-reflective member 70 which has an inclined mirror surface 70a which is silvered so as to reflect light therefrom. The inclined mirror surface 70a of the mirror 70 is at such an angle that the light beam is deflected at substantially a right angle with respect to the axis of the tool, and as illustrated the angle of the surface 70a is slightly less than 45°. Therefore, the light beam is directed substantially laterally after it is reflected from the silvered or mirror surface 70a.

Figure 4:
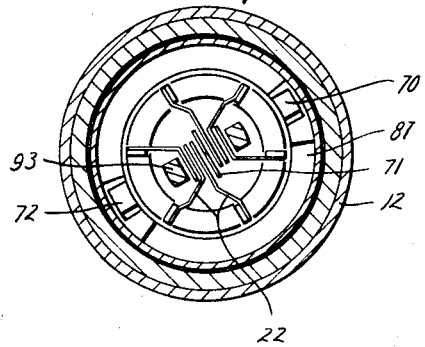
Figure 4 is a horizontal sectional view taken on line 4—4 of Figure 2C and illustrates in particular the arrangement of the light interceptor strips of the tool of this invention.

The light beam is thus directed toward a slit member 71 (Figures 2C, 4 and 7) which has a slit 71a formed therein of a predetermined size. The portion of the light beam which passes through the slit 71a is projected to a second mirror 72 which has an inclined surface 72a which also has been silvered for causing the light to be changed in its direction at an angle of slightly less than 90 degrees so that the light beam travels almost vertically and is thereby directed through a second barrier member 73. From the barrier member 73, the light beam extends upwardly and by means of a pair of mirrors 75 and 76 having silvered or mirror surfaces 75a and 76a, respectively, the light beam is changed in position and direction and is aligned with the central axis of the tool, whereby the light beam is directed to a convex focus lens 77 thereabove. The light beam, after passing through the focus lens 77, is projected onto a silvered or mirror surface 78a of mirror 78 for changing the direction of the light beam to a substantially lateral direction for projection of a focussed image of the slit 71a onto the chart 79, which chart is formed in the shape of a cylinder and is of a photo-sensitive or light sensitive material, such as the usual photographic paper or film, whereby the light beam exposes a portion of the film or photo sensitive chart surface 79 in accordance with the particular shape of the focussed image.

The particular shape of the image as it is projected onto the chart surface 79 is determined by the shape of the slit 71a (Figure 7) and by the position of the light interceptor strips 22. Ordinarily, with all of the feelers 10 in contact with a smooth cylindrical surface, all of the lower edges of the light interceptor strips 22 are aligned in the same lateral plane and the light beam passes therebelow and through the slit 71a, or a portion thereof. As any one of the light interceptor strips 22 is moved downwardly, it intercepts a portion of the light beam at the upper end of same and therefore reduces the apparent length of the illuminated slit as viewed from the mirror 72 so as to in that manner alter the shape of the image as it is projected upwardly and onto the chart 79. The light interceptor strips 22 are arranged with a portion of each substantially parallel to the corresponding portion of the other interceptor strips (Figure 4), and all of such parallel portions of the interceptor strips 22 are parallel to the slit member 71. With such an arrangement, it will be evident that the feeler which moves the furthest outwardly will cause the light interceptor strip connected therewith to move the furthest downwardly and thus such light interceptor strip which is the furthest downward with respect to the housing 12 will actually control the extent or length of the image of the slit which is projected upwardly from the mirror 72.

From the above description of the light beam and the variation thereof for projection onto the chart for making the record of the feeler movement, it is believed evident that the various details of the particular construction illustrated in the drawings can be changed without departing from the invention; however, certain details of the present construction will facilitate the understanding of the present invention. For example, the barrier members 69 and 73 are provided for the purpose of preventing any of the fluid in the chamber 67 from flowing upwardly into the electrical mechanism. A seal ring 81 is provided around the flange 69a of the member 69 for sealing purposes. Rubber or other suitable cushion rings 80 are disposed on either side of the flanges 69a of barrier member 69 to prevent breaking or chipping of the member 69 since such member 69 is generally formed of glass or a similar fragile material. The rings 80 are maintained in engagement with the barrier 69 by upper and lower threaded sleeve inserts 82 and 83, respectively. As shown in the drawings, the barrier member 73 is mounted in identical manner having cushion members 80' and seal ring 81' with insert sleeves 82' and 83' for retaining the cushion elements in position. Although the members 69 and 73 are illustrated as being in the same sealed-off portion of the device, it should be pointed out that they can be mounted in separate chambers from each other so that each in effect is in its own sealed-off portion of the device.

Figure 5:
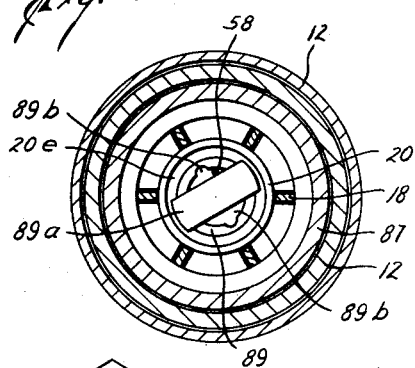
Figure 5 is a horizontal sectional view taken on line 5—5 of Figure 2C and illustrates in particular the upper end of the fluid equalizing chamber of the device.

The barrier member support cylinder 84 has an upper seal ring 85 and a lower seal ring 86 (Fig. 3) for preventing the passage of fluid from the fluid chamber 67 upwardly around the cylinder 84. The fluid in the chamber 67 is not the well fluid, but is a clear transparent fluid which is itself sealed off from the well fluid but, as will be explained, the device is so constructed that the fluid chamber 67 is under the same fluid pressure as the well fluid. Thus, the mirror support ring 87 has a pair of sealing rings 88 which are formed of rubber or other elastic material, confined between the lower edge thereof and the upper surface of the shoulder 20c of the back-up element or cylinder 20 to thereby prevent well fluid from flowing upwardly through the slots 12a around the body 20 and into the fluid chamber 67. Such seals 88 also prevent the outflow of the transparent clear fluid in the chamber 67. An annular trap 87a (Figs. 2C and 5) is provided above the seals 88 for receiving solids and foreign matter which might otherwise accumulate on the mirrors 70 and 72.

At the upper end of the bore 20d of the back-up cylinder 20, a sleeve 89 having a lateral support strip 89a connected therewith is mounted with the strip 89a resting upon the lateral shoulder 20e. Openings 89b (Figs. 2C and 5) are thus provided to establish fluid communication between the bore 20d and the fluid chamber 67 above the support strip 89a. It will be observed (Fig. 5) that the electrical wire 58 is directed through one of the openings 89b.

A sleeve 90 extends upwardly into the lower end of the bore 20d and is in sealing contact with a seal ring 91a carried by insert 91 secured to the cylinder 20. The sleeve 90 is adapted to move longitudinally relative to the seal ring 91a without disengagement therefrom, whereby the seal is constantly maintained in use. A sleeve 92 formed of rubber or other elastic material to serve as a diaphragm or bellows is connected to the reduced lower end 90a of the sleeve 90. The wire 58 is led through the sleeve 90 and through the diaphragm 92 and is sealed against the passing of fluid by a reduction in diameter of the sleeve 92 which forms an elastic contact sealing member 92a at the lower end of the diaphragm 92 so that fluid cannot ordinarily flow around wire 58 into or out of the diaphragm 92. The diaphragm 92 is adapted to be compressed or expanded in accordance with the changes in the well fluid pressure exteriorly thereof so as to impart such changes to the transparent clear fluid in the chamber 67. Also, as the support arms 18 move into and out of the fluid in the chamber 67 in response to the movement of the feelers 10, the diaphragm 92 expands or contracts in accordance with the changes in fluid pressure of the fluid in the chamber 67 caused by such movement of the arms 18.

The latching cylinder 31 and the sleeve 90 are connected for movement together by pin 31b or other suitable connecting means. Perforations 31a are preferably provided in the latching cylinder 31 so as to provide adequate fluid communication from the well bore to the exterior of the diaphragm 92.

With the above arrangement wherein the chamber 67 is sealed off, the light beam is adapted to pass through the fluid in the fluid chamber 67 while at the same time any relatively muddy or clouded fluid which may be in the well is not permitted to interfere with the light beam.

The slit member 71 is, as previously mentioned, substantially parallel with the mutually parallel portions of the light interceptor members or strips 22. Such slit member 71 may be mounted on a substantially rectangular frame 93 which is secured to the support strip 89a on the sleeve 89. Thus, the slit member 71 is maintained in a predetermined position in the tool with respect to the interceptors 22 and also with respect to the mirrors 70 and 72. For maintaining the barrier members 69 and 73 aligned with the mirrors 70, keys 94a, 94b and 95a (Figures 2C and 3) are employed, but it will be appreciated that any other suitable aligning means for accurately positioning the mirrors in proper relationship to the light source and to the barrier members 69 and 73 could be utilized.

The film or chart 79 is mounted in a cylindrical chart holder 94 (Figure 2B) which is adapted to be rotated or otherwise moved at a predetermined rate relative to the focused image of the light beam which is projected onto the film 79. One mechanism for imparting such relative rotation to the chart holder 94 and the chart 79 connected therewith, is illustrated in Figures 2A and 2B, wherein a drive wheel 95 is adapted to frictionally engage the inside of the tubing or pipe P being calipered so that upon the upward movement of the tool, the wheel or drive member 95 is rotated. The drive roller 95 is mounted on a pivoted lever 96 which is normally urged outwardly for positioning the roller 95 in contact with the inside of the pipe P by a leaf spring 97 or any other suitable resilient means. The rotation of the drive wheel 95 is imparted through worm 98 and gear 99 to a shaft 100 which has a conventional one-way drive 101 associated therewith whereby only rotation of the drive wheel 95 in a clockwise direction as the device A is moved upwardly in pipe P is transmitted to the lower portion 100a of the shaft 100. The lower portion 100a of the shaft 100 is connected through a universal joint 103 to a stub shaft 102 which has a seal ring 102a in sealing contact therewith. Such seal ring 102a is made of a plastic, polytetrafluoroethylene, sold under the trademark "Teflon," such material having a low coefficient of friction. Since a seal is formed by the ring 102a, it is possible to maintain the area within the housing 12 and below the seal ring 102a and above the seal ring 85 at a reduced pressure, preferably a vacuum. The check valve 113 is provided for use during the evacuation of the housing area below the seal ring 102a and above the seal ring 85. The shaft 102 connects to a gear train, including gears 104, 105, 106 and 107. The pivot or axis of the universal joint 103 is in alignment with the pivot pin 96a so that the worm 98 and gear 99 remain in engagement when the wheel 95 pivots about pivot pin 96a. The gear 107 drives a longitudinally extending drive shaft 108 which is keyed to a drive sleeve 109 which in turn is keyed to a ring 110 secured to the upper end of the chart holder 94, whereby the rotation of the drive wheel 95 is transmitted to the chart holder 94 to impart rotation to such chart 79 mounted on the holder 94. The lower end of the chart holder 94 has a drive nut 112 secured thereto with the threads 112a being relatively coarse compared to the threads 112b which are used for connecting the drive nut 112 to the chart holder 94. The threads 112a on the nut 112 engage with an externally threaded sleeve 114 having external threads 114a, which are also coarse and interengaged with the threads 112a. Such threaded sleeve 114 is positioned below the lower end of the shaft 108 and a bearing 116 is provided for permitting the shaft 108 to rotate relative to the sleeve 114. The threaded sleeve 114 is keyed to an internal sleeve 118 by the key 119 and such sleeve 118 is in turn keyed by the key 118a to the member 84 which is connected to the housing 12. Therefore, the threaded sleeve 114 is held against rotation. With the threaded sleeve 114 thus held against rotation, the rotation of the chart holder 94 and the nut 112 therewith effects a longitudinal movement of the chart holder 94 relative to the threaded sleeve 114. Such longitudinal movement, of course, results in a longitudinal movement of the photographic film or chart 79 relative to the projected image from the mirror surface 78a through the opening 114b in the threaded sleeve 114. The resulting chart would of course therefore be in a helical path. It should be mentioned that any means for eliminating stray light could be utilized; for example, the interior of the housing 12 and the parts therein can be painted black. Also, the usual optic diaphragms or light stops could also be used, one of which is illustrated at 114d and another at 114f (Figure 2B), as will be evident to those skilled in the art. Also, to reduce the effect of heat in a well on the film 79, a vacuum can be created in the interior of the chart holder 94 and both sides of the body or housing 12 and the holder 94 can be highly polished to reflect light therefrom.

It should be pointed out that the focus lens 77 is carried within a focus lens holder or tube 120 which has a square opening 120a at the lower end thereof so that the distance of the lens 77 from the mirror surface 78a can be varied by rotation of the tube 120 for moving same longitudinally with respect to the sleeve 114. Thus, upon a rotation of the tube 120, the interengagement of the thread 120b and 114c causes the tube 120 to move longitudinally relative to the sleeve 114 so that the image of the slit 71a is focused on the photographic paper properly. It will be appreciated, of course, that once the focus lens 77 is set at the proper focus position or distance from the mirror surface 78a, then the lens 77 does not have to be changed unless the distances of the slit 71a from the mirrors 70 and 72 are changed, or the system is otherwise optically changed. Also, of course, the relative positions of the lens 77, slit 71a and the image thereof, determine the degree of magnification of the image as it is projected onto the chart.

The light 55 is not turned on until the chart holder 94 has moved upwardly relative to the threaded sleeve 114 a predetermined distance due to the fact that a control rod 122 which extends through opening 114e is maintained in contact with the lower end of the nut 112 and rests upon the resilient switch extension 57c (Figure 2C). Thus, as the device is lowered into the well pipe or tubing P, the contact points 57a and 57b are maintained out of engagement because the rod 122 holds the extension 57c downwardly. However, upon an upward movement of the tool so as to impart a rotation to the drive wheel 95, the rod 122 is permitted to move upwardly with the upward movement of the nut 112 whereby the inherent resiliency of the extension 57c moves the contact 57b upwardly to engage the contacts 57a and 57b, and thus the electrical circuit is closed from the battery 56 to the light bulb 55 using the housing 12 as a ground so that thereafter a record is photographically obtained on the photographic film or light sensitive chart material 79.

During the lowering of the calipering tool A into the well tubing or pipe P to position same at the lower end of the pipe P to be calipered, the drive wheel 95 is held in a retracted position out of contact with the inside surface of the pipe P so that no record will be obtained during the lowering of the tool. The mechanism for retaining the drive wheel 95 in the retracted position is shown in Figure 2A and it includes a slidable shaft 125 which is normally urged upwardly by a spring 126, the upward movement thereof being limited by the contact of a shoulder or member or nut 127 with the lower end of a lateral surface 128 within the body 12 of the tool A. As the tool A is lowered into the tubing or pipe P, the slidable shaft 125 is held in a lowered position with the shoulder member or nut 127 below the lateral surface 128 by means of a pivoted arm or lever 130 which is in the dotted line position for holding the shoulder member or nut 127 below the lateral surface 128. The lever 96 which carries the drive wheel 95 has extension 132 at its upper end which is positioned to the left (as viewed in Figure 2A) of the lower end of the shaft 125 so that it cannot move to the right by the urging of the spring 97 so long as the shaft 125 is in its lowered position with the pivoted lever 130 in its dotted line position. However, when the lever 130 is pivoted to the left (its full line position) the spring 126 urges the shaft 125 upwardly so as to position the lower end of the shaft 125 above the upper end of the extension 132, whereby the spring 97 is free to move the wheel 95 to the right into contact with the inside surface of the pipe or tubing P.

A trip finger 135 is provided for effecting the swinging or pivoting of the pivot lever 130 from its latch position to the release position. Such finger 135 has an elongate opening 135a therein through which a pivot pin 136 extends, such pin 136 being mounted on the body 12. A spring 137 is attached to the body 12 and is connected to the upper rear portion of the finger 135 for exerting a force to swing the finger 135 in a clockwise direction. During the lowering of the tool A into the pipe P, the inclined face 135b of the finger 135 is in contact with the inside surface of the pipe P and therefore is positioned for engagement with such inside surface. Therefore, no lateral force is exerted on the locking lever 130 during the downward travel of the tool. However, upon an upward movement of the tool, the finger 135 engages the bottom of a joint in a collar Y so that it is pivoted about the pivot pin 136 from the dotted line position of Figure 2A to the solid line position of Figure 2A. During such pivotal movement, the rear side 135c moves laterally and effects the lateral movement of the lock lever 130 from the lock position to the released position, thereby permitting the upward movement of the shaft 125 to release the drive wheel 95 for driving engagement.

In the operation or use of the well caliper tool illustrated in Figures 1–9, the tool A is lowered into the tubing or well pipe P on the flexible line or other support F to a point below the lowermost point from which the calipering of the surface irregularities in the tubing or pipe P are to be obtained. During such lowering, the drive wheel 95 is held in the retracted position and the feelers or contact member 10 are also held in the retracted position, whereby no record is obtained during such lowering operation. The inclined surface 135b of the trip finger 135 is in sliding engagement with the inside surface of the tubing or pipe P and therefore the lock arm or lever 130 is in the locking position during such lowering with a shear pin 130a holding the lever 130 in such position. Also, the release finger 40 at the lower end of the tool is in sliding engagement with the inside surface of the pipe P during the lowering of the tool and therefore the feelers 10 are maintained in their latched or retracted position.

When the tool A has been lowered to the bottom of the pipe or to the point below the bottom of the portion of the pipe to be calipered, then the tool is raised by raising upwardly on the flexible line or support F. During such raising, the trip or release member 40 and the release finger 135 are moved into the collars in the pipe and are thereby actuated. As previously explained, the engagement of the trip finger 40 in the collar such as the collar X, causes a downward movement of the rod 37 and the shearing of the shear pin 38 which permits the spring 35 to move the annular lock ring 30 downwardly for releasing the feelers 10 so that the resilient members 25 act to urge the feelers 10 into engagement with the inside surface of the pipe P. Similarly, the trip finger 135 engages in a collar such as the collar Y, to cause same to pivot downwardly as the tool is moved upwardly, whereby the lock lever 130 is urged to the left to shear the shear pin 130a and to thereafter move the lever 130 to its released position for permitting the upward travel of the shaft 125 by the urging of the spring 126, whereby the shaft 125 is moved upwardly a sufficient distance to enable the wheel 95 to be urged to the right into engagement with the inside surface of the pipe P by reason of the resilient force of the spring 97. Thereafter, upon continued upward movement of the tool A, the driving wheel 95 is rotated to transmit its rotation to the holder 94 for the chart 79.

The rotation of the holder 94 and the chart 79 also imparts rotation to the annular nut 112 so that an upward movement of the chart relative to the threaded sleeve 114 is effected.

The upward movement of the nut 112 initially permits the upward movement of the rod 122 due to the inherent resiliency of the portion 57c of the switch 57, whereby the contacts 57a and 57b ultimately are permitted to contact each other due to the upward movement of the lower portion 57c of the switch 57. When the switch 57 is closed, the light bulb 55 is then on and the light beam is directed through the device as previously explained.

Since the feelers 10 are also released and are moving in accordance with the surface irregularities they encounter as the tool is moved upwardly in the pipe P, the light interceptor strips 22 are therefore being moved in accordance with such surface irregularities, whereby the light beam is being varied or altered in response to the surface variations or irregularities encountered in the pipe. Thus, as the light beam is transmitted from the light bulb or source 55 to the mirror 70 and through the slit 71a, the projected image of the slit is of course varied in accordance with the movement of the strips 22 and such image is directed upwardly by the mirrors 72, 75 and 76 through the focus lens 77 whereupon the focussed image is reflected from the mirror surface 78a (Figure 2B) onto the photographic film or photosensitive material 79 forming the chart for making the record of the surface variations in the inside of the pipe, as previously explained. In the particular construction shown in Figure 2B, the chart is moved in a helical path which corresponds with the incline or pitch of the threads 114a and 112a so that a continuous record is obtained as the tool A is raised upwardly in the tubing or pipe P.

In Figure 12A, a typical record of one portion of the chart 79 is illustrated, such chart having been made when using light interceptors 22 of the type shown in Figures 2C and 12. As illustrated in Figure 12, and also in Figures 13 and 14, the interceptors 22, 22' and 22'' are inverted so as to correspond with the records shown in Figures 12A, 13A and 14A. Such interceptors 22 are solid, that is, they have no openings therethrough, so that the lower edge is relied upon for determining the extent of the light beam which passes to the photographic film or chart 79. In Figure 12A, the upper or clear portion 79a represents the exposed portion of the film after one pass, and the lower portion 79b indicates the portion which has not been exposed and is therefore outside the light beam area on the film. The portions of the film 79 designated by the letters M and O indicate the type of records usually made where the pipe is flattened or has been worn by rod wear or other causes. The letter N designates a collar, while the portion R designates a corrosion area adjacent to the collar N. The areas S and T designate corrosion pits in the pipe and U designates another collar, while V designates a corrosion area adjacent to the collar. The substantially lateral portions of the strip other than the portions M and O indicate smooth pipe.

When the light interceptor strips are modified as indicated by the strips 22' so as to include an opening 150, the record obtained is varied to some extent as indicated by the typical record shown in Figure 13A which represents the same record as would be obtained in the same pipe as in Figure 12A. In Figure 7, the light interceptors 22' are illustrated and the light beam is indicated as being formed into two light beams diagrammatically, but actually, light is projected from the same light source 55 to the prism 70 by way of the condenser lens 68 so that the beam is of sufficient width so that light passes below the lower edges of the light interceptors 22' and also through the openings 150. It will be appreciated that with such construction of the light interceptors, a record would be obtained in a smooth pipe with all of the light interceptors 22' aligned so that the light image would appear as a light area with a band therebetween represented by the lower portion 151 (Figures 7 and 13). As the light deflectors 22' move up and down in response to the movement of the feelers 10, the lowermost light interceptor 22' will determine the extreme lower portion of the light which is cut out, and the interceptor which is furthest upwardly in the tool will determine the boundary line L due to the fact that the narrow portion 151 of the furthest upward feeler 22' intercepts some of the light passing through the openings 150 formed in the other interceptor members 22'.

A comparison of the photographic record obtained in Figure 13A with that obtained in Figure 12A, indicates the differences obtained when using the light interceptor strips 22' rather than the light interceptor strips 22. The upper boundary of the unexposed part 79b of the chart in Figure 13A gives the same information as the upper boundary of the unexposed part 79b obtained in Figure 12A, but the lower boundary of the unexposed part 79b is varied so as to produce the exposed area 79c in Figure 13A. If all of the feelers and light interceptors 22' move outwardly substantially together such as at collars in a pipe, then the lower boundary is varied as at exposed areas 200 and 201. When one feeler and its interceptor 22' move outwardly, then the indications at portions R' and S' are obtained which have the characteristic unexposed areas 203 and 204. The reduced area 205 resulted from a flattened or elliptical section of the pipe.

In Figure 14, a still further modification of the light interceptor member 22 is illustrated and such modified construction is designated by the numeral 22'' which has an opening 153 with a wire or cross hair or other similar member 154 extending laterally across near the end of the slot 153. With such arrangement, the record obtained is illustrated in Figure 14A, and it is the record which would be made in the same section of pipe as that used for making the records of Figures 12A and 13A. The similar areas are designated by the same letters with double prime marks following same. With the construction of Figure 14, it will be evident that in the usual case of corrosion, the record indicates a separate line for each light interceptor member 22'' which may be of value for determining the extent of corrosion areas.

In Figure 10, a modified slit member 171 is illustrated which is identical with the slit member 171 of Figure 7, except that a plurality of spaced cross-hairs or wires 155 are disposed across the face of the slit 171a. The wires 155, of course, intercept light as the light beam passes through the slit, with the result that a grid formed by the parallel shadows of the wires 155 is obtained on the chart in coordinated relationship with the photographic image of the light beam. The same object may also be accomplished by disposing wires similarly across the opening 114g in diaphragm 114d.

Figure 11A:
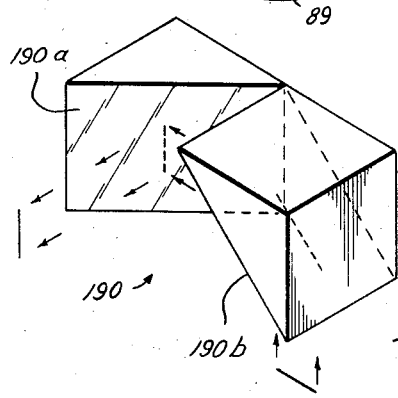
Figure 11A is an isometric view of one type of double mirror arrangement for reflecting and rotating the image of a light filament onto a film strip.

In Figure 11, a modified caliper tool is illustrated wherein the record is obtained on a photographic film in the form of a chart strip 175, rather than a film in the form of a cylinder 79, as in the previously described form of the invention. Also, the construction of Figure 11 is modified with respect to the form shown in Figures 1–9 in that the light source has a straight line filament 176 which emits the light rather than passing a light through a slit as in the form of Figures 1–9.

In using the straight line filament 176 of the light bulb or source 177, it is positioned in a transparent cylinder 178 which is fluid tight so that the fluid in the fluid chamber 67 does not contact the light source 177. The light filament 176 is disposed below and adjacent to the light deflectors or interceptors 22 so that the length of the image of the filament 176 which is transmitted or projected to the film 175 is varied or altered in accordance with the lowermost light interceptor strip 22. The mirror 180 has a surface 180a which may be convex and which is silvered for reflecting the image of the filament 176 upwardly through the barrier member 173 and the light passage 84a in the body 84 to the focus lens 77 which is mounted in a manner similar to that shown in Figure 2B within the housing or cylinder 12. The light beam is focussed by the focus lens 77 and is reflected and rotated by a mirror arrangement 190 which includes the mirrors 190a and 190b (Figure 11A) through a light stop or diaphragm 181 and thence to the photographic film tape 175 where the record is made. The mirror 190 may be a double prism, a pair of mirrors, or any other well known construction for reflecting and rotating the image of the filament 176 so that it is perpendicular to the direction of movement of the film 175, and in Figure 11A, one suitable arrangement is illustrated which includes the two mirrors 190a and 190b. The chart strip or film 175 can be mounted and fed relative to the slit 181 in any suitable manner, but as illustrated, the film is initially disposed on the pay-out reel 183 and is wound up on the take-up reel 184. The sprocket wheel 185 drives the tape and causes same to feed downwardly for winding up around the take-up reel 184. The rotation of the drive wheel 185 is coordinated with the upward movement of the tool in the pipe being calipered and for this purpose, a bevel gear 186 is employed which is connected to the shaft 108 in any suitable manner so that the wheel 95 of Figure 2A can be used for driving same. The tape can also be driven by a spring or by a contact roller arrangement illustrated in U. S. Patent No. 2,544,609 issued to D. B. McMahan. For closing the switch 57 to engage the electrical contacts 57a and 57b to initially cause the filament 176 to become lighted, an operating rod 195 is slidably mounted within the housing 12 and is moved downwardly by a lug 196 as the take-up reel 184 moves clockwise. A suitable ratchet 197 is mounted for contact with the actuating rod 195 so that after the rod 195 has been forced downwardly to move the contacts 57a and 57b into engagement, the ratchet 197 holds the rod 195 in such lowered position. Therefore, the projection or lug 196 does not contact the rod 195 except during the initial downward movement, but the switch 57 is maintained closed after such initial downward movement of the rod 195. The parts which are identical or similar in Figure 11 to the corresponding parts in Figures 1–9 have the same numerals, except as referred to above in connection with the description of the Figure 11 modification.

The operation of the Figure 11 device is the same as that for Figures 1–9 except that the record is obtained on the tape and the light does not pass through the light slit.

It will be evident that the strip chart shown in Figure 11 can be used in the modification of Figures 1–9 instead of the cylindrical chart 79. Also, the use of a straight line filament 176 of Figure 11 could be used in the form of the invention shown in Figures 1–9 in place of the light bulb 55 and the slit member 71 having the slit 71a therein. Additionally, it should be noted that the use of the convex mirror surface 180a rather than the flat mirror surface 72a permits the positioning of the interceptors 22 a greater distance from the filament 176 or slit 71a while still maintaining proper focussing due to the fact that the convex mirror surface 180a provides a greater depth of focus than the flat mirror surface 72a. Therefore, it may be desirable to use a convex mirror instead of the flat mirror 72a in some instances to obtain a sharper image of the interceptors 22 at the same time that the slit 71a is in focus.

It should also be pointed out that the slit 71a could be positioned immediately adjacent to and intercepting light before it reaches the recorder chart 79 instead of adjacent to the light interceptors 22. For example the diaphragm 144d could serve as a slit either in place of or inconjunction with the slit 71a. Also, as will be understood by those skilled in the optical art, there could be two or more lenses arranged in the usual manner of telescopes and similar optical instruments for focusing the image projected in the caliper tool; in such case, the slit could alternatively be positioned between the lenses so long as it is at or near a focal point of the lenses.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. In a caliper tool adapted to be moved longitudinally in a pipe for making a record of surface variations on the inside of the pipe and having a plurality of feelers for contact with the pipe, the improvement residing in, means for making said record of the surface variations including, a light-sensitive chart, means for transmitting a light beam to said chart, and means operable when said tool is moved longitudinally in the pipe for varying the light beam in accordance with the surface variations on the inside of said pipe for making a record on said chart the extent of which is controlled by only the feeler which has moved the furthest outward at each elevation traversed by the caliper tool.

2. In a pipe calipering tool adapted to be moved longitudinally in a pipe and having record means for making a record of the surface variations in the pipe, means for contacting the pipe and adapted to be moved in accordance with the surface variations in the pipe, the improvement residing in the record means, including a chart having a light-sensitive surface thereon, and means for projecting a light pattern onto the light-sensitive surface of said chart to photographically expose same to said light pattern, means for moving said chart longitudinally relative to said light pattern, and means for varying the light pattern projected on said light-sensitive surface in response to the lateral movements of the contacting means as they are moved longitudinally in the pipe whereby a record is obtained on the chart of the surface variations in the pipe.

3. In a pipe caliper tool having a plurality of circumferentially spaced contact feelers adapted to contact the inside surface of a pipe for movement in accordance with the surface variations thereof, the improvement residing in, a chart, means for projecting a light beam onto said chart, and means associated with said feelers for changing the extent of one end of said light beam which is projected onto said chart in accordance with the furthest outward feeler.

4. A pipe calipering tool for making a record of the surface variations on the inside of a pipe, comprising contact means for contacting the inside surface of the pipe for movement in response to the surface variations thereof, a light source within said tool transmitting a light beam in a predetermined path into an area of said tool exposed to the fluid pressure in the pipe being calipered, means in said area for varying the extent of said light beam in response to movements of said contact means, whereby the variations in the light beam are indicative of the variations in the inside surface of said pipe, and means for sealing off said light source from said area exposed to the fluid pressure in the pipe.

5. In a well pipe caliper having a housing, means to support and move said housing longitudinally through said well pipe, recorder means, drive means to move said recorder means as said housing is moved through said well pipe, feeler means to contact said well pipe adapted to move in accordance with variations in the internal surface of said well pipe, recording means and transmitting means to transmit the movement of said feeler means to said recording means, the improvement residing in said recording means, including a light source, a slit illuminated by light from said light source, means to interrupt said light near said slit as a function of the movement of said transmitting means, and focussing means for causing an image of said slit to fall on said recorder means.

6. In a well recording instrument, a light source emitting a light beam, a solid pressure barrier conducting said light beam, a liquid conducting said light beam and exposed to the well fluid pressure, means for varying said light beam in its path through said liquid, a second solid pressure barrier conducting said light beam, and photographic means in an area of said instrument which is sealed off from said liquid for recording the variations in said light beam.

7. In a well caliper tool for recording surface variations in a pipe and having recording means, contact means for contacting the pipe and adapted to be moved in accordance with the surface variations in the pipe, transmitting means for transmitting the movement of the contacting means to the recording means whereby a record is made of such surface variations, the improvement residing in the transmitting means including an illuminated line, means to form an image of said line on said recording means, drive means to cause longitudinal relative movement between said recording means and said image as said tool is moved in said pipe, and means to interrupt portions of said image in accordance with the movement of said contact means.

8. In a pipe caliper tool having a housing, recording means within the housing, contact means for contacting the pipe carried by the housing, transmitting means for transmitting surface variations in the pipe from the contacting means to the recording means, said transmitting means including a light beam, and said contact means having a plurality of feeler members, and an interceptor strip operatively connected to each feeler member for intercepting the light beam in accordance with the movement of said feeler members, the interceptor strips each having one edge thereof adapted to be aligned with each other to form a single straight edge on the portion of the light beam transmitted past said interceptor strips when the feelers are all in contact with a smooth surface of the pipe.

9. In an internal tube wall calipering and recording device adapted to be passaged through an extended length of tubing the combination comprising, an elongated housing, recording means including a photosensitive recorder member and optical recording means mounted in said housing, a plurality of movable feelers spaced circumferentially of said housing and adapted for movement between said housing and the tube wall being calipered, mechanical actuating means for said recording means operable by said feelers and mounted in said housing for reciprocal movement therein, and a plurality of movement transmitting means, one for each of said feelers, operable to transmit outward movement of said feelers to said actuating means, each movement transmitting means including means for urging the corresponding feeler outwardly of said housing and for urging its movement transmitting means whereby said optical recording means is variable in response to any of said feelers but is varied to an extent corresponding to and controlled by only the greatest outward feeler movement at any instance during a calipering passage.

10. In a pipe caliper tool having a housing, recording means within the housing, means for contacting the pipe carried by the housing, transmitting means for transmitting surface variations in the pipe from the contacting means to the recording means, the improvement, residing in the transmitting means, including a light source, a slit, a plurality of bars across and adjacent to said slit mounted for reciprocal movement longitudinally with respect to said slit and with respect to each other in accordance with surface variations in the pipe, and a lens, said slit being adapted to transmit light from said light source through said lens so that said lens focuses the image of said slit as interrupted by said bars onto said recording means.

11. A device for measuring surface irregularities, comprising a plurality of feelers for contacting said surface irregularities, means for transmitting a light beam in said device, a light interceptor operatively connected with each feeler for intercepting portions of said light beam, the extent of light interception by a particular interceptor of one portion of the beam being increased as the extent of interception of another portion of the beam by the same interceptor decreases whereby the maximum and minimum surface irregularities are indicated at each portion of the surface contacted by said feelers.

12. In a device for locating irregularities on the inside surface of a long string of pipe, a housing, a plurality of elongated spring members circumferentially arranged therein, a contact finger for each of said members urged by said spring members into engagement with the inside surface of the pipe for locating irregularities therein as said housing is moved therethrough, said housing serving as a base support for said spring members, an axially movable transmitting member for each of said contact fingers mounted within said housing adapted to move axially in response to lateral movement of the contact finger associated therewith, each of said transmitting members having a projection thereon, and each of said contact fingers having recesses for receiving said projections to cause axial movement of each of said transmitting members upon lateral movement of the contact finger associated therewith.

13. In a well caliper tool for recording surface variations in a pipe and having a recording means, a plurality of feelers pivotally mounted in said tool for contacting the pipe and adapted to be moved in accordance with the surface variations in the pipe, transmitting means for transmitting the movement of the contacting means to the recording means whereby a record is made of such surface variations, the improvement residing in the transmitting means, including means for projecting an illuminated image to said recording means, a light interceptor associated with each of said feelers for varying said image in accordance with the surface variations in the pipe, and means connecting said feelers with said light interceptors whereby the pivotal movements of the feelers are transmitted to the light interceptors longitudinally moving same.

14. In an instrument adapted to be used in a well, a recording mechanism including, a housing having a chamber therein, seal means for maintaining said chamber sealed off from the rest of the housing, a recorder means in said chamber having a chart adapted to be moved relative to said housing, and a rotatable drive means extending through said seal means in sealing contact therewith for effecting the movement of said chart relative to said housing.

15. In an instrument adapted to be used in a well, a recording mechanism including, a housing having a chamber therein, seal means for maintaining said chamber sealed off from the rest of the housing whereby a reduced pressure can be maintained in said chamber to reduce heat transmission therein, a recorder means in said chamber including a photosensitive chart, means outside of said chamber for transmitting a light beam to said chart, and a material having a heat reflective surface disposed between said photosensitive chart and the well fluid whereby the effect of the heat from the well fluid on the chart is reduced to thereby prevent heat damage to said chart.

16. In a device for locating surface variations in a well pipe, a support means, a plurality of circumferentially spaced feelers mounted on said support means for lateral displacement as said feelers contact surface variations on the inside surface of the well pipe, a plurality of transmitting members within said device engageable one with each of said feelers for responding to the movement of each feeler, and optical means for selecting and measuring the displacement of the feeler displaced the furthest from normal said optical means including means for transmitting a light beam, and a light interceptor operated by each transmitting member for movement in accordance with the feeler connected therewith to vary said light beam so that the interceptor connected with the feeler furthest from normal controls the extent of the variation in the light beam.

17. A pipe caliper tool having laterally movable contact means for engaging the surface of a pipe to be calipered, and means for locking said contact means against lateral movement upon the movement of said caliper tool in one direction in the pipe and for releasing said contact means upon the movement of said caliper tool in the other direction in the pipe, said locking means including retainer means releasably engageable with said contact means for preventing lateral movement of said contact means, movable means releasably secured in said tool for maintaining said retainer means in engagement with said contact means, urging means to urge said retainer means out of engagement with said contact means upon a release of said movable means, and release means operable upon the movement of said tool in said other direction to release said movable means whereby the urging means moves said retainer means out of engagement with said contact means to enable same to move laterally.

18. A pipe caliper tool having laterally movable contact means for engaging the surface of a pipe to be calipered, and means for locking said contact means against lateral movement upon the movement of said caliper tool in one direction in the pipe and for releasing said contact means upon the movement of said caliper tool in the other direction in the pipe, said locking means including retainer means releasably engageable with said contact means for preventing lateral movement of said contact means, movable means releasably secured in said tool for maintaining said retainer means in engagement with said contact means, a resilient release member fixed to said movable means and extending outwardly from said tool for sliding movement along the inside of the pipe being calipered as said tool is moved in said one direction to prevent the release of said retainer means and for the engagement with the pipe at one of the pipe joints upon movement of said tool in said other direction to effect a movement of said movable means, and means for disengaging said retainer means from said contact means upon said movement of said movable means to thereby release the contact means for lateral movement.

19. A pipe caliper tool having laterally movable contact means for engaging the surface of a pipe to be calipered, and means for locking said contact means against lateral movement upon the movement of said caliper tool in one direction in the pipe and for releasing said contact means upon the movement of said caliper tool in the other direction in the pipe, said locking means including retainer means releasably engageable with said contact means for preventing lateral movement of said contact means, movable means releasably secured in said tool for maintaining said retainer means in engagement with said contact means, urging means to urge said retainer means out of engagement with said contact means upon a release of said movable means, release means operable upon the movement of said tool in said other direction to release said movable means whereby the urging means moves said retainer means out of engagement with said contact means to enable same to move laterally, and a latching means associated with said movable means for latching said movable means to prevent the return thereof from its released position to thereby prevent any inadvertent locking of said contact means by reason of a coaction of said movable means with said retainer means.

References Cited in the file of this patent

UNITED STATES PATENTS

| | | |
|---|---|---|
| 2,102,080 | Kinley | Dec. 14, 1937 |
| 2,281,960 | Vacquier | May 5, 1942 |
| 2,313,310 | Arnold | Mar. 9, 1943 |
| 2,317,632 | Miller | Apr. 27, 1943 |
| 2,382,609 | Dale | Aug. 14, 1945 |
| 2,567,548 | Chaney et al. | Sept. 11, 1951 |
| 2,596,924 | Fredd | May 13, 1952 |
| 2,645,027 | Eastman et al. | July 14, 1953 |
| 2,667,109 | Piety | Jan. 26, 1954 |
| 2,686,101 | Davis | Aug. 10, 1954 |
| 2,695,456 | Roberts | Nov. 30, 1954 |
| 2,708,316 | Fredd | May 17, 1955 |
| 2,771,685 | Kinley | Nov. 27, 1956 |

OTHER REFERENCES

H. H. Haddock: "Deep Borehole Surveys and Problems," McGraw-Hill Book Co., Inc., New York, 1931; pages 29, 30 and 31.